Patented Dec. 4, 1934

1,982,977

UNITED STATES PATENT OFFICE 1,982,977

AZO DYESTUFFS CONTAINING A PYRENE NUCLEUS

Alfred Bergdolt, Cologne-on-the-Rhine, Gerhard Schrader, Opladen, and Martin Corell, Frankfort-on-the-Main, Germany, assignors to General Aniline Works, Inc., New York, N. Y., a corporation of Delaware No Drawing. Application December 15, 1932, Serial No. 647,474. In Germany December 22, 1931

18 Claims. (Cl. 260—86)

The present invention relates to new water insoluble azodyestuffs, more particularly it relates to dyestuffs which may be represented by the probable general formula:

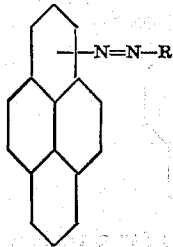

wherein R stands for the radical of a coupling component suitable for producing an azodyestuff free from a group inducing solubility in water, such as the sulfonic- or carboxylic acid group; that means, R may bear as substituents, for example, alkyl, alkoxy, halogen, the nitro group, a substituted amino group and the like, and wherein the pyrene nucleus may be substituted by halogen or alkoxy.

As coupling components favorably used in our invention there may be mentioned by way of example, 2,3-hydroxy-naphthoic acid arylamides and arylamides of o-hydroxycarboxylic acids of other ring systems, such as of 2-hydroxyanthracene-3-carboxylic acid, 2-hydroxyphenanthrene-3 - carboxylic acid, 2 - hydroxycarbazole-3-carboxylic acid, 2-hydroxy-α-benzocarbazole-3-carboxylic acid (compare U. S. Patent 1,867,106).

Our new dyestuffs are obtainable by diazotizing in the usual manner an aminopyrene which may be substituted by substituents not inducing solubility in water, for example, by alkoxy or halogen, and coupling in substance or on the fibre with a coupling component of the kind referred to above. The dyestuffs when produced on the fibre according to the known methods of producing ice colors generally yield grey to blue to violet to green shades of good fastness to boiling and chlorine.

The invention is illustrated by the following examples, without being limited thereto:

Example 1.—50 grams of cotton yarn are impregnated for about ½ hour in a grounding liquor of 1 litre prepared in the usual manner and containing 6 grams of 2,3-hydroxynaphthoylaminobenzene at a temperature of 30° C. The cotton yarn is well squeezed and introduced for about ½ hour into a developing bath, neutralized by sodium acetate, and containing 2.55 grams of diazotized 1-aminopyrene-hydrochloride. The cotton is rinsed, soaped at the boil and dried. A reddish dark blue of good fastness properties is thus obtained. The dyestuff has the following formula:

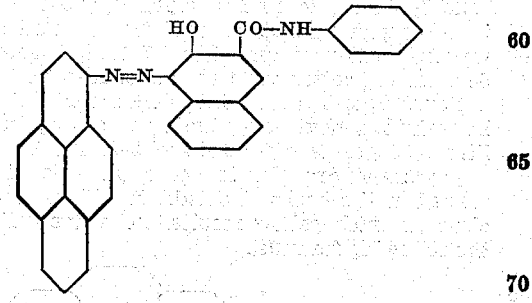

The 1-aminopyrene is obtainable by nitrating pyrene and reducing the nitro compound, as described in "Monatshefte für Chemie, vol. II, (1881), page 580 seq.".

In an analogous manner there is obtained from diazotized 1-aminopyrene and 1-(2',3'-hydroxynaphthylamino)-nitrobenzene a dyestuff of the formula:

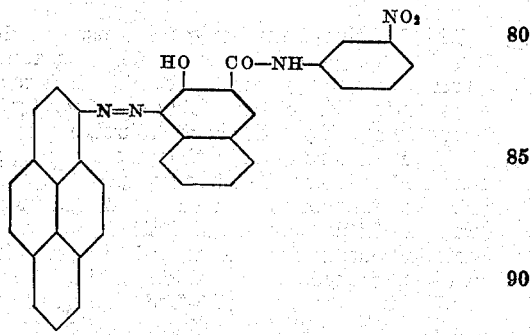

yielding dark blue shades of very good fastness properties.

In an analogous manner there is obtained from diazotized 1-aminopyrene and 2-(2', 3'-hydroxynaphthoylamino)-naphthalene a dyestuff of the formula:

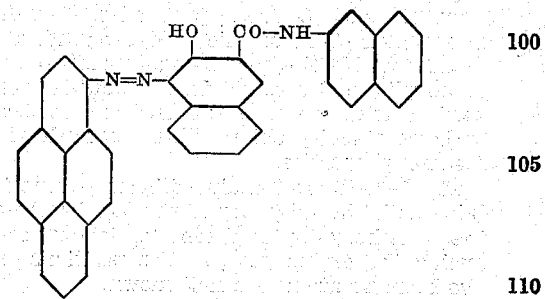

yielding reddish dark blue shades of good fastness to chlorine and washing.

In an analogous manner there is obtained from diazotized 1-aminopyrene and 1-(2'-hydroxyanthracene-3-carbonylamino)-2-methylbenzene a dyestuff of the following formula:

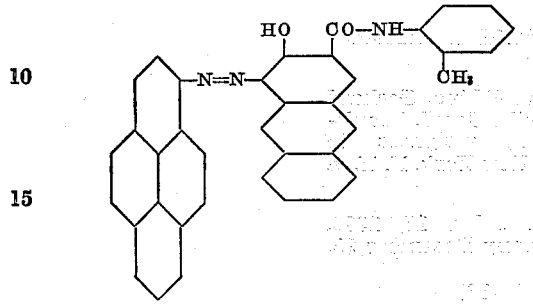

yielding bluish dark green shades of good fastness properties.

*Example 2.*—3.5 grams of 2-hydroxyanthracene-3-carboxylic acid-o-toluidide are dissolved in hot water with some caustsic soda and filled up with water to one litre. Into this solution 50 grams of cotton yarn are introduced for about 1 hour, squeezed and introduced for about ½ hour into a developing bath containing in one litre 2.85 grams of diazotized 2-amino-1-methoxypyrene-hydrochloride. The yarn is rinsed, soaped at the boil and dried. In this manner a clear greenish yellow results. The dyestuff has the following formula:

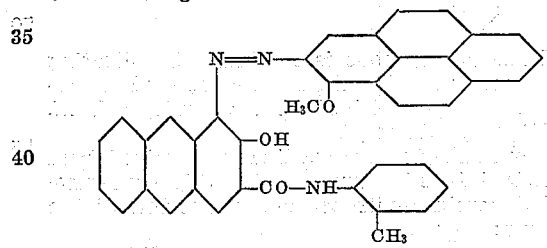

The 2-amino-1-methoxypyrene used as diazotization component is obtainable by sulfonating pyrene, whereby pyrene-1-sulfonic acid is formed, substituting the sulfonic acid group by a hydroxy group by melting with caustic alkali, methylating the hydroxy group, nitrating the 1-methoxypyrene and reducing the nitro group.

In an analogous manner as described in paragraph 1 of this example, diazotized 1-methoxy-2-aminopyrene yields with: 2-hydroxynaphthalene-3-carboxylic acid anilide a bluish-grey of good fastness properties; 2-hydroxynaphthalene-3-carboxylic acid-β-naphthylamide a greenish-bluish-grey of good fastness properties; 2-hydroxycarbazole-3-carboxylic acid-p-chloroanilide a dark blue of good fastness properties.

In an analogous manner diazotized 1-methoxy-2-amino-dibromopyrene yields with: 2-hydroxynaphthalene-3-carboxylic acid anilide a bluish-grey of good fastness properties; 2-hydroxynaphthalene-3-carboxylic acid-β-naphthylamine a greenish-bluish-grey; 2-hydroxyanthracene-3-carboxylic acid-o-toluidide a yellowish-green of good fastness properties; 2-hydroxycarbazole-3-carboxylic acid-p-chloranilide a corinth of good fastness properties.

The 1-methoxy-2-amino-dibromopyrene is obtainable by brominating to the two-bromo-stage the 1-methoxy-2-nitropyrene (see above) and reducing the amino group. The positions of the two bromine atoms are not known.

We claim:
1. Azodyestuffs of the general formula:

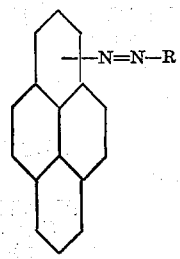

wherein R stands for the radical of a coupling component suitable for producing an azodyestuff free from a group inducing solubility in water, and wherein the pyrene nucleus may be substituted by halogen or alkoxy, yielding, when produced on the fibre, generally grey to blue to violet to green shades of good fastness properties.

2. Azodyestuffs of the general formula:

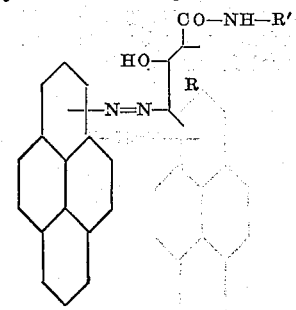

wherein R stands for a radical of the naphthalene-, anthracene-, carbazole- or benzocarbazole-series, and R' stands for a radical of the benzene or naphthalene series, and wherein the pyrene nucleus may be substituted by substituents selected from the group consisting of alkoxy and halogen, yielding, when produced on the fibre, generally grey to blue to violet to green shades of good fastness properties.

3. Azodyestuffs of the general formula:

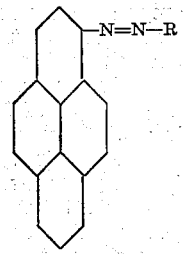

wherein R stands for the radical of a coupling component suitable for producing an azodyestuff free from a group inducing solubility in water, yielding, when produced on the fibre, generally grey to blue to violet to green shades of good fastness properties.

4. Azodyestuffs of the general formula:

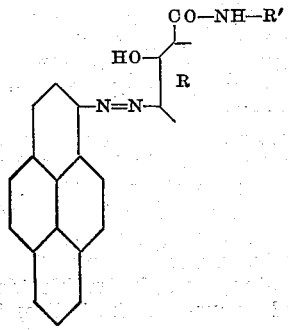

wherein R stands for a radical of the naphthalene-, anthracene-, carbazole- or benzocarbazole-series, and R' stands for a radical of the benzene or naphthalene series, yielding, when produced on the fibre, generally grey to blue to violet to green shades of good fastness properties.

5. Azodyestuffs of the general formula:

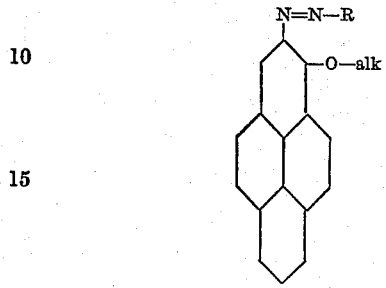

wherein "alk" stands for an alkyl group R stands for the radical of a coupling component suitable for producing an azodyestuff free from a group inducing solubility in water, and wherein the pyrene nucleus may be substituted by halogen, yielding, when produced on the fibre, generally grey to blue to violet to green shades of good fastness properties.

6. Azodyestuffs of the general formula:

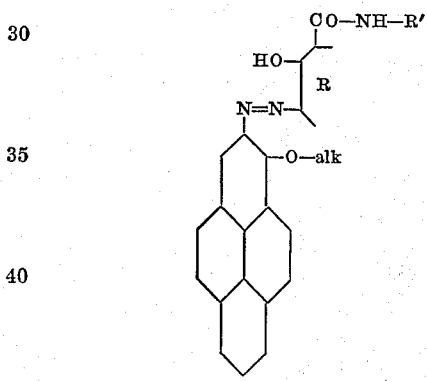

wherein "alk" stands for an alkyl group, R stands for a radical of the naphthalene-, anthracene-, carbazole- or benzocarbazole-series, and R' stands for a radical of the benzene or naphthalene series, and wherein the pyrene nucleus may be substituted by halogen, yielding, when produced on the fibre, generally grey to blue to violet to green shades of good fastness properties.

7. Azodyestuffs of the general formula:

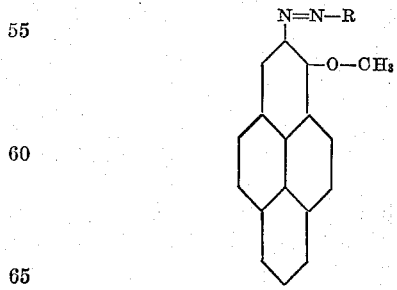

wherein R stands for the radical of a coupling component suitable for producing an azodyestuff free from a group inducing solubility in water, yielding, when produced on the fibre, generally grey to blue to violet to green shades of good fastness properties.

8. Azodyestuffs of the general formula:

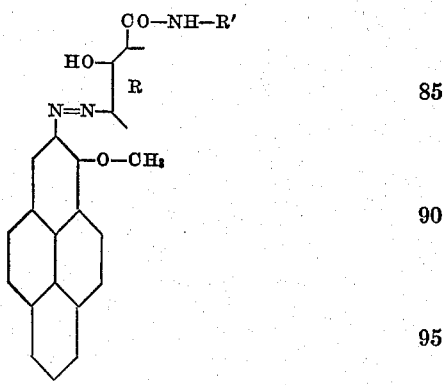

wherein R stands for a radical of the naphthalene-, anthracene-, carbazole- or benzocarbazole-series, and R' stands for a radical of the benzene or naphthalene series, yielding, when produced on the fibre, generally grey to blue to violet to green shades of good fastness properties.

9. The azodyestuff of the following formula:

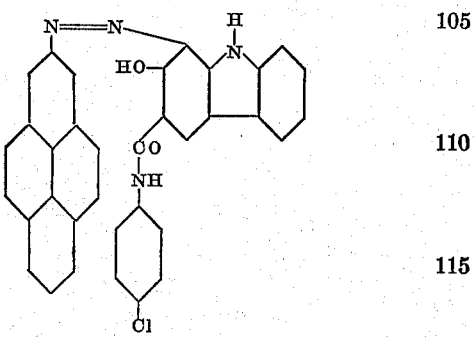

yielding, when produced on the fibre, dark blue shades of good fastness properties.

10. Fibre dyed with a dyestuff as claimed in claim 1.

11. Fibre dyed with a dyestuff as claimed in claim 2.

12. Fibre dyed with a dyestuff as claimed in claim 3.

13. Fibre dyed with a dyestuff as claimed in claim 4.

14. Fibre dyed with a dyestuff as claimed in claim 5.

15. Fibre dyed with a dyestuff as claimed in claim 6.

16. Fibre dyed with a dyestuff as claimed in claim 7.

17. Fibre dyed with a dyestuff as claimed in claim 8.

18. Fibre dyed with the dyestuff as claimed in claim 9.

ALFRED BERGDOLT.
GERHARD SCHRADER.
MARTIN CORELL.